(12) United States Patent
Falanga et al.

(10) Patent No.: US 9,329,990 B2
(45) Date of Patent: May 3, 2016

(54) HOST CONTROLLED ENABLEMENT OF AUTOMATIC BACKGROUND OPERATIONS IN A MEMORY DEVICE

(71) Applicant: Micron Technology, Inc., Boise, ID (US)

(72) Inventors: Francesco Falanga, Pozzuoli (IT); Danilo Caraccio, Buonalbergo (IT)

(73) Assignee: Micron Technology, Inc., Boise, ID (US)

( * ) Notice: Subject to any disclaimer, the term of this patent is extended or adjusted under 35 U.S.C. 154(b) by 562 days.

(21) Appl. No.: 13/739,453

(22) Filed: Jan. 11, 2013

(65) Prior Publication Data

US 2014/0201473 A1 Jul. 17, 2014

(51) Int. Cl.
*G06F 12/00* (2006.01)
*G06F 12/02* (2006.01)

(52) U.S. Cl.
CPC .... *G06F 12/0246* (2013.01); *G06F 2212/7211* (2013.01)

(58) Field of Classification Search
CPC .......... G06F 12/00; G06F 12/12; G06F 13/00
USPC .......................................... 711/100, 154, 200
See application file for complete search history.

(56) References Cited

U.S. PATENT DOCUMENTS

| | | | |
|---|---|---|---|
| 7,945,914 B2 | 5/2011 | Hasiuk | |
| 8,185,903 B2 | 5/2012 | Fulton et al. | |
| 2008/0294813 A1 | 11/2008 | Gorobets | |
| 2009/0006719 A1 | 1/2009 | Traister | |
| 2009/0132754 A1* | 5/2009 | Riska et al. | 711/103 |
| 2010/0306446 A1 | 12/2010 | Villa et al. | |
| 2012/0173792 A1* | 7/2012 | Lassa et al. | 711/103 |
| 2012/0260118 A1 | 10/2012 | Jiang et al. | |

\* cited by examiner

*Primary Examiner* — Tuan Thai
(74) *Attorney, Agent, or Firm* — Dicke, Billig & Czaja, PLLC

(57) ABSTRACT

A host that is coupled to a memory device is configured to read a status register of the memory device to determine if the memory device supports host controlled enablement of automatic background operations. The memory device responds to the host regarding whether the memory device supports host controlled enablement of automatic background operations. The host can enable the automatic background operations if the memory device supports this feature. The host can then set a time period in the memory device that is indicative of when the memory device can automatically perform the background operations.

21 Claims, 5 Drawing Sheets

HOST CONTROLLED ENABLEMENT OF AUTOMATIC BACKGROUND OPERATIONS IN A MEMORY DEVICE

TECHNICAL FIELD

The present embodiments relate generally to memory and a particular embodiment relates to host controlled enablement of automatic background operations in a memory device.

BACKGROUND

Memory devices are typically provided as internal, semiconductor, integrated circuits in computers or other electronic devices. There are many different types of memory including random-access memory (RAM), read only memory (ROM), dynamic random access memory (DRAM), synchronous dynamic random access memory (SDRAM), and non-volatile (e.g., flash) memory.

Flash memory devices have developed into a popular source of non-volatile memory for a wide range of electronic applications. Flash memory devices typically use a one-transistor memory cell that allows for high memory densities, high reliability, and low power consumption. Changes in threshold voltage of the cells, through programming of a charge storage structure, such as floating gates, trapping layers or other physical phenomena, determine the data state of each cell. Common uses for flash memory include personal computers, personal digital assistants (PDAs), digital cameras, digital media players, digital recorders, games, appliances, vehicles, wireless devices, cellular telephones, and removable memory modules.

In addition to performing access operations such as read and write, a non-volatile memory device also performs background operations. For example, the memory device might perform a wear leveling operation by moving data around within the memory array of the memory device. Another background operation might be a housekeeping operation that removes obsolete data in order to free up memory blocks to be erased and reused. These operations are performed in the background typically without the knowledge of the host and, in some embodiments, are performed automatically by the memory device (e.g., are initiated without being commanded by the host).

A problem can occur when these background operations are being performed by the memory device without the knowledge of the host. The host can interrupt the background operation by sending an access command or turning off the power to the memory device. This can result in lost or corrupted data and might require the memory device to start the background operation over, thus resulting in a loss of performance.

DETAILED DESCRIPTION

Figure 1:
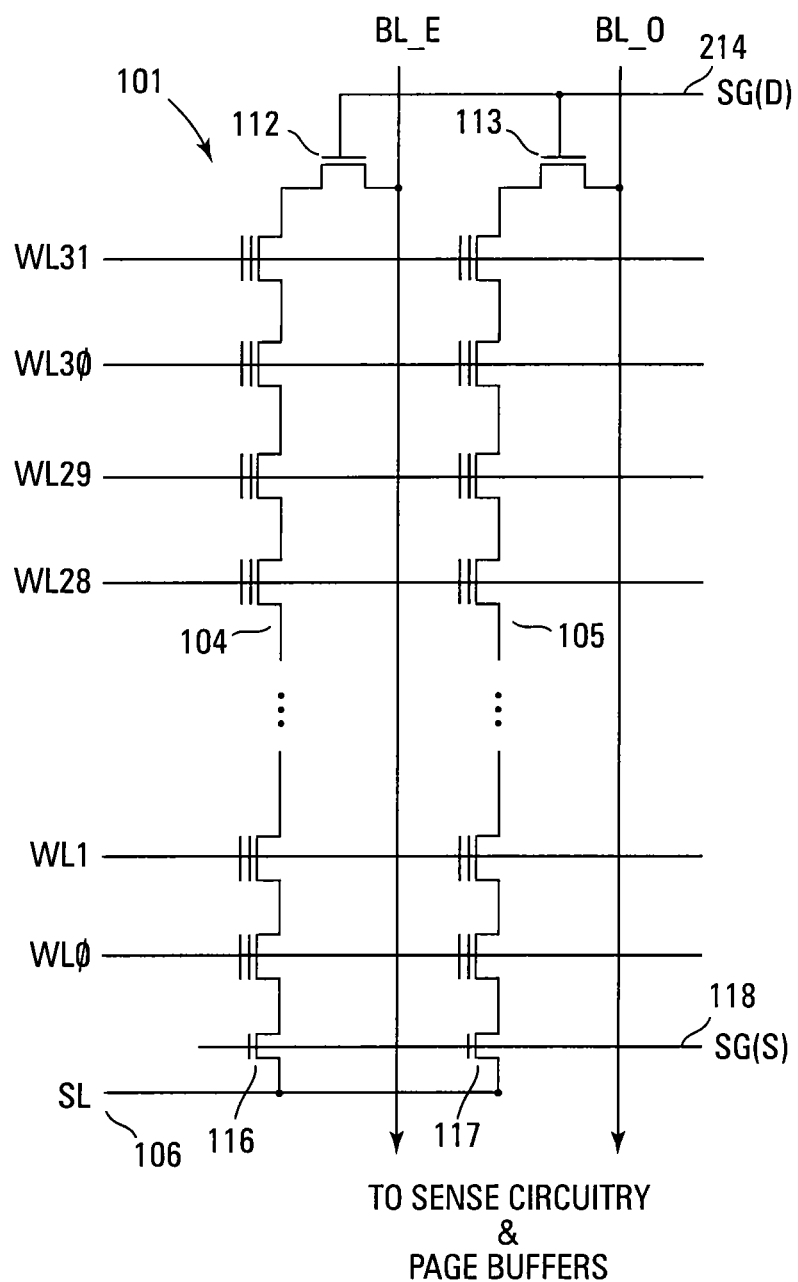
FIG. 1 shows a schematic diagram of one embodiment of a portion of a NAND architecture memory array.

In the following detailed description, reference is made to the accompanying drawings that form a part hereof and in which is shown, by way of illustration, specific embodiments. In the drawings, like numerals describe substantially similar components throughout the several views. Other embodiments may be utilized and structural, logical, and electrical changes may be made without departing from the scope of the present disclosure. The following detailed description is, therefore, not to be taken in a limiting sense.

Non-volatile memory can utilize different architectures including NOR and NAND. The architecture designation is derived from the logic used to read the devices. In NOR architecture, a logical column of memory cells is coupled in parallel with each memory cell coupled to a data line, such as those typically referred to as bit lines. In NAND architecture, a column of memory cells is coupled in series with only the first memory cell of the column coupled to a bit line.

FIG. 1 illustrates a schematic diagram of one embodiment of a portion of a NAND architecture memory array 101 comprising series strings of non-volatile memory cells. This figure is for purposes of illustration of a typical memory array only as a method for host controlled enablement of automatic background operations in a memory device and is not limited to the illustrated NAND architecture.

The memory array 101 comprises an array of non-volatile memory cells (e.g., floating gate) arranged in columns such as series strings 104, 105. Each of the cells is coupled drain to source in each series string 104, 105. An access line (e.g., word line) WL0-WL31 that spans across multiple series strings 104, 105 is coupled to the control gates of each memory cell in a row in order to bias the control gates of the memory cells in the row. Data lines, such as even/odd bit lines BL_E, BL_O, are coupled to the series strings and eventually coupled to sense circuitry and page buffers that detect and store the state of each cell by sensing current or voltage on a selected bit line.

Each series string 104, 105 of memory cells is coupled to a source line 106 by a source select gate 116, 117 (e.g., transistor) and to an individual bit line BL_E, BL_O by a drain select gate 112, 113 (e.g., transistor). The source select gates 116, 117 are controlled by a source select gate control line SG(S) 118 coupled to their control gates. The drain select gates 112, 113 are controlled by a drain select gate control line SG(D) 114.

In a typical prior art programming of the memory array, each memory cell is individually programmed as either a single level cell (SLC) or a multiple level cell (MLC). A cell's threshold voltage ($V_t$) can be used as an indication of the data stored in the cell.

For example, in an SLC memory device, a $V_t$ of 2.5V might indicate a programmed cell while a $V_t$ of −0.5V might indicate an erased cell. In an MLC memory device, multiple $V_t$ ranges can each indicate a different state by assigning a bit pattern to a specific $V_t$ range.

Figure 2:
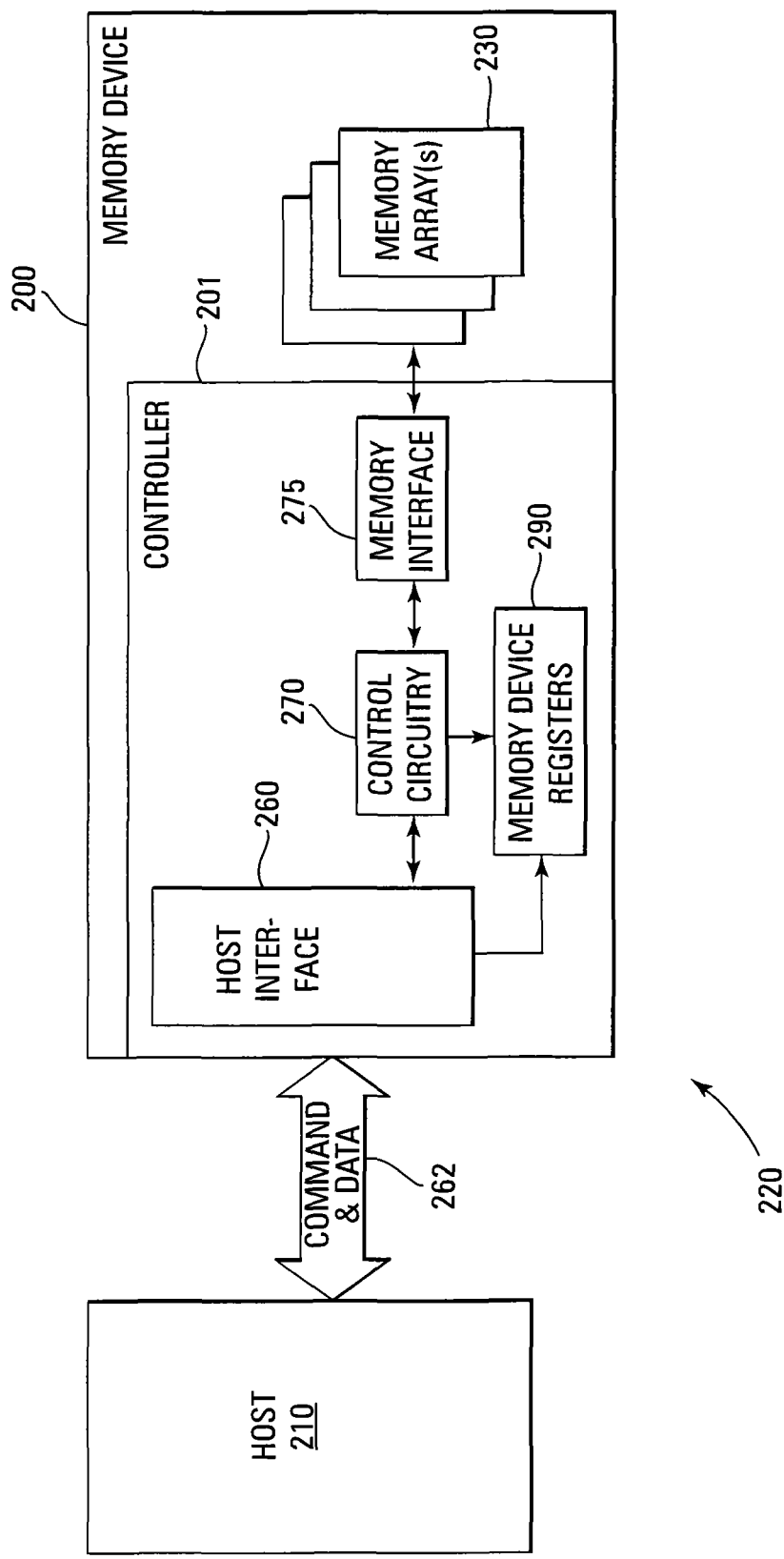
FIG. 2 shows a block diagram of one embodiment of a system that can incorporate a non-volatile memory device using a method for host controlled enablement of automatic background operations.

FIG. 2 illustrates a functional block diagram of a memory device 200 that can include a memory array architecture such as illustrated in FIG. 1. The memory device 200 is coupled to an external host 210 that acts as some type of controller. The host 210 can be configured to communicate commands (e.g., write, read), control signals, and data with the memory device 200 over a command and data bus 262 that connects the host 210 with the memory device 200. The memory device 200 and the host 210 form part of a system 220.

The memory device 200 includes one or more arrays 230 of memory cells (e.g., NAND architecture non-volatile memory cells). The memory array 230 is arranged in banks of word line rows and bit line columns. In one embodiment, the columns of the memory array 230 comprise series strings of memory cells. One example of a portion of such an array is illustrated in FIG. 1.

Host interface circuitry 260 provides an interface between the memory device 200 and the host 210. The host interface circuitry 260 might include circuitry such as buffers and registers.

Control circuitry 270, coupled to the host interface 260, operates in response to control signals from the host 210. These signals are used to control the operations of the memory array(s) 230, including data sense (e.g., read), data write (e.g., program), and erase operations. The control circuitry 270 may be a state machine, a sequencer, or some other type of control circuitry that is configured to control generation of memory control signals. In one embodiment, the control circuitry 270 is configured to control execution of the method for host controlled enablement of background operations.

Memory interface circuitry 275, coupled between the control circuitry 270 and the memory array(s) 230, provides bidirectional data communication between the control circuitry 270 and the memory array(s) 230. The memory interface circuitry 275 can include write circuitry, read circuitry, decoders, and buffers.

Memory device registers 290, coupled to the host interface 260 and the control circuitry 270, can be a part of the control circuitry 270 or separate from the control circuitry 270. The registers 290, as subsequently described, can be used to store control data for operation of the method for host controlled enablement of background operations. In one embodiment, the control circuitry 270 controls writing to and reading from the memory device registers 290 as directed by control signals from the host 210 over the command and data bus 262, as subsequently described. In another embodiment, the host 210 can write directly to and read directly from the registers 290 without control circuitry 270 intervention.

In one embodiment, the host interface 260, the control circuitry 270, the memory interface 275, and the memory device registers 290 are part of the memory device controller 201. Alternate embodiments of the controller 201 can include only a subset of these blocks or additional memory device circuitry.

The host can use the registers in the memory device to determine the status and capabilities of the memory device (e.g., status register), enable/disable automatic background operations of the memory device (e.g., enablement register), and/or set a minimum time period before the memory device can automatically perform (e.g., execute) or enables automatic background operations (e.g., time register). The registers can include different registers or different register bits in one register for enabling different background operations (e.g., allowing for selective enablement of different automatic background operations). The automatic background operations of the memory device can be any background operations performed in the memory device that do not require host initiation. For example, these background operations can include wear leveling, collection of bad or old data, unused memory block erasing, and/or other memory housekeeping operations.

In operation, the memory device register can be set to a first state (e.g., logical 0) to indicate that the memory device does not support host controlled enablement of automatic background operations and a second state (e.g., logical 1) to indicate that the memory device supports host controlled enablement of automatic background operations. If the host reads the state that indicates that the memory device does not support enablement of automatic background operations, this can indicate that the subsequently described registers (e.g., enablement, time) are not activated or not present. If the host reads the state that indicates that the memory device supports enablement of automatic background operations, this can indicate that the subsequently described registers are also activated and/or present.

In one embodiment, the memory device register is a read only register that is programmed prior to being used. For example, when the memory device is manufactured, the memory device register of a particular memory device can be programmed as supporting enablement of automatic background operations. In an alternate embodiment, the status register can be programmed at a time after manufacture depending on the application of the system.

If the host determines that the memory device supports enablement of automatic background operations, the host can write control data to a particular memory device register (e.g., enablement register) to enable/disable automatic background operations of the memory device. For example, the host can write a first state (e.g., logical 0) to the enablement register to indicate to the memory device that the memory device is allowed to initiate automatic background operations. In such an embodiment, the memory device can automatically perform the background operations during any host idle time and/or during execution of read/write operations and/or other operations initiated by the host.

The host can write a second state (e.g., logical 1) to the enablement register to indicate to the memory device that the host will periodically enable the background operations. This indicates to the memory device not to automatically perform the background operations. In such a configuration, only the host will initiate the background operations.

In one embodiment, the enablement register is a write/read register. This allows the host to not only write to the register but also to read it later to determine if it has been reset or written to by the memory device controller.

The host can also write to particular control registers (e.g., time registers) in order to set a particular time period that indicates to the memory device (e.g., controller) the minimum time period to wait after completing the operation commanded by the last received host command before automatically performing (e.g., initiating and/or executing) or enabling automatic background operations. The memory device can also decide not to take into account such time period set by the host and start its background activity before new arriving host commands are executed without any impact on performance. The time registers can be write/read registers so that, for example, the host can load one time register with an actual time period value that the memory device should wait after completing the operation commanded by the last received host command before automatically performing or enabling automatic background operations. A second time register can be loaded with the actual time period value's unit of measure (e.g., µs, ms, s). The memory controller can then use both time registers in combination to determine how long to wait before automatically performing or enabling automatic background operations. In an alternate embodiment, only one time period register is used and it is assumed to have a fixed unit of measure (e.g., µs, ms, or s).

In another alternate embodiment, the memory device might not have a time register. In such an embodiment, the memory device could have another particular register (e.g., start register). If host enablement of automatic background operations is supported by the memory device, the host can write control data (e.g., start data) to the start register whenever it is desired to start (e.g., initiate) background operations. This data can be automatically cleared by the memory controller after the background operations have begun to execute.

In yet another alternate embodiment, the memory device might have both the time register(s) and the start register. In such an embodiment, instead of waiting for the time period in the time register after completing the last operation commanded by the host before automatically performing the background operations, the memory device would wait for the time period in the time register after receiving the start data from the host before automatically performing the background operations.

In another alternate embodiment, the memory device can perform the automatic background operations in response to an explicit command from the host while also having the capability of automatically performing the automatic background operations without an explicit command from the host. In yet another embodiment, the time register(s) could be used to determine when to enable the automatic background operations instead of when to begin performing the automatic background operations.

Figure 3A:
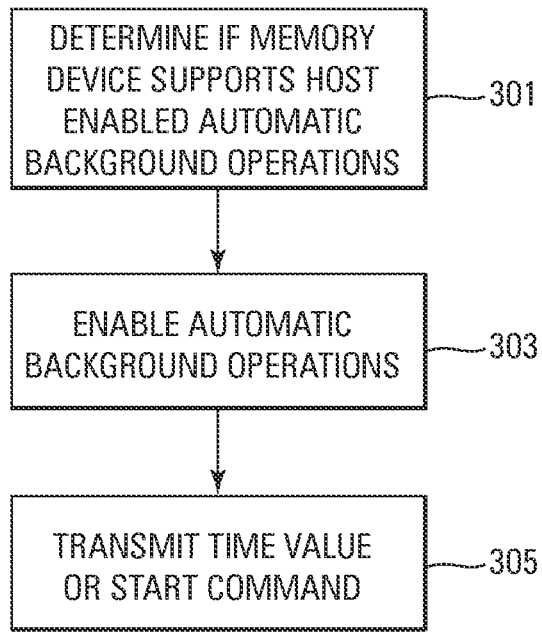
FIGS. 3A and 3B show flowcharts of embodiments of the method for host controlled enablement of automatic background operations.
Figure 3B:
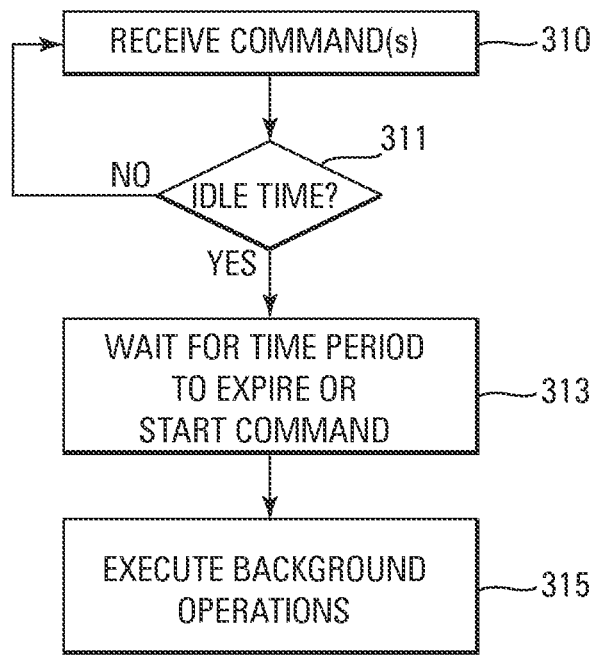

FIGS. 3A and 3B illustrate flowcharts of embodiments of the method for host enablement of automatic background operations in a memory device. FIG. 3A illustrates a flowchart of a method that is executed by the host. FIG. 3B illustrates a flowchart of a method that is executed by the memory device.

As illustrated in FIG. 3A, the host first determines if the memory device supports the host controlled enablement of automatic background operations 301. As previously described, this can be accomplished by reading a register of the memory device. If the memory device supports host controlled enablement of automatic background operations, the host can then enable the automatic background operations 303. This can be accomplished by writing control data to another register of the memory device. If the memory device has one or more control registers for time period values, the host can transmits the time period value to the memory device 305 along with, in one embodiment, the unit of measure value for the time period value. In another embodiment, the host can transmit a start command 305 to the memory device when the host is done sending other commands and wishes the memory device to begin start background operations.

As illustrated in FIG. 3B, the memory device receives commands from the host 310. The memory device then determines if any more commands have been received or if the memory device is experiencing an idle time 311 during which no commands are received from the host. If another command is received 310, the memory device executes the commands and again checks for idle time 311. If the memory device is experiencing idle time 311, it waits for the time period stored in the time register(s) to expire 313 prior to automatically performing the background operations 315.

In another embodiment, the memory device would be able to execute an automatic background operation at the same time as receiving host read/write commands. This could be accomplished without affecting the performance of the read/write operations. Such a memory device would not take into account any minimum idle time after completing the host commands but could initiate the automatic background operations even before the read/write are completed.

If the memory device does not support the time period value register (e.g., it is not present or is not activated), the memory device can determine if the last received command was a start command 313. Receiving this command indicates to the memory device to start the background operations.

Figure 4:
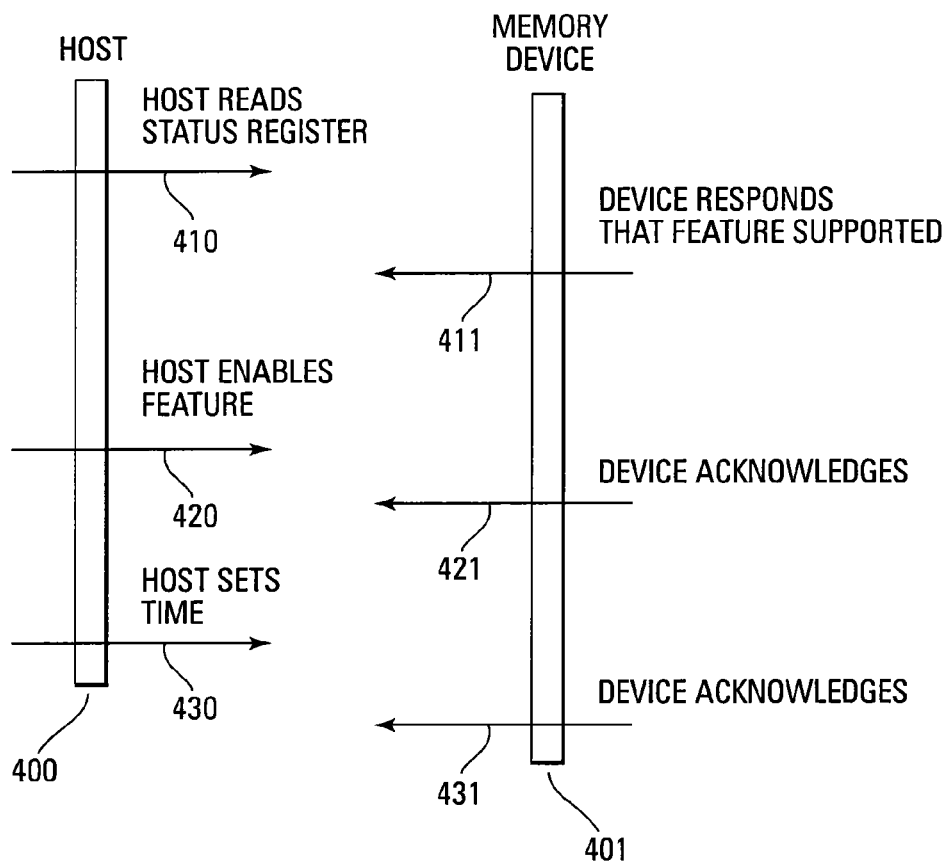
FIG. 4 shows a diagram of a check and configuration phase of the method for host controlled enablement of automatic background operations.
Figure 5:
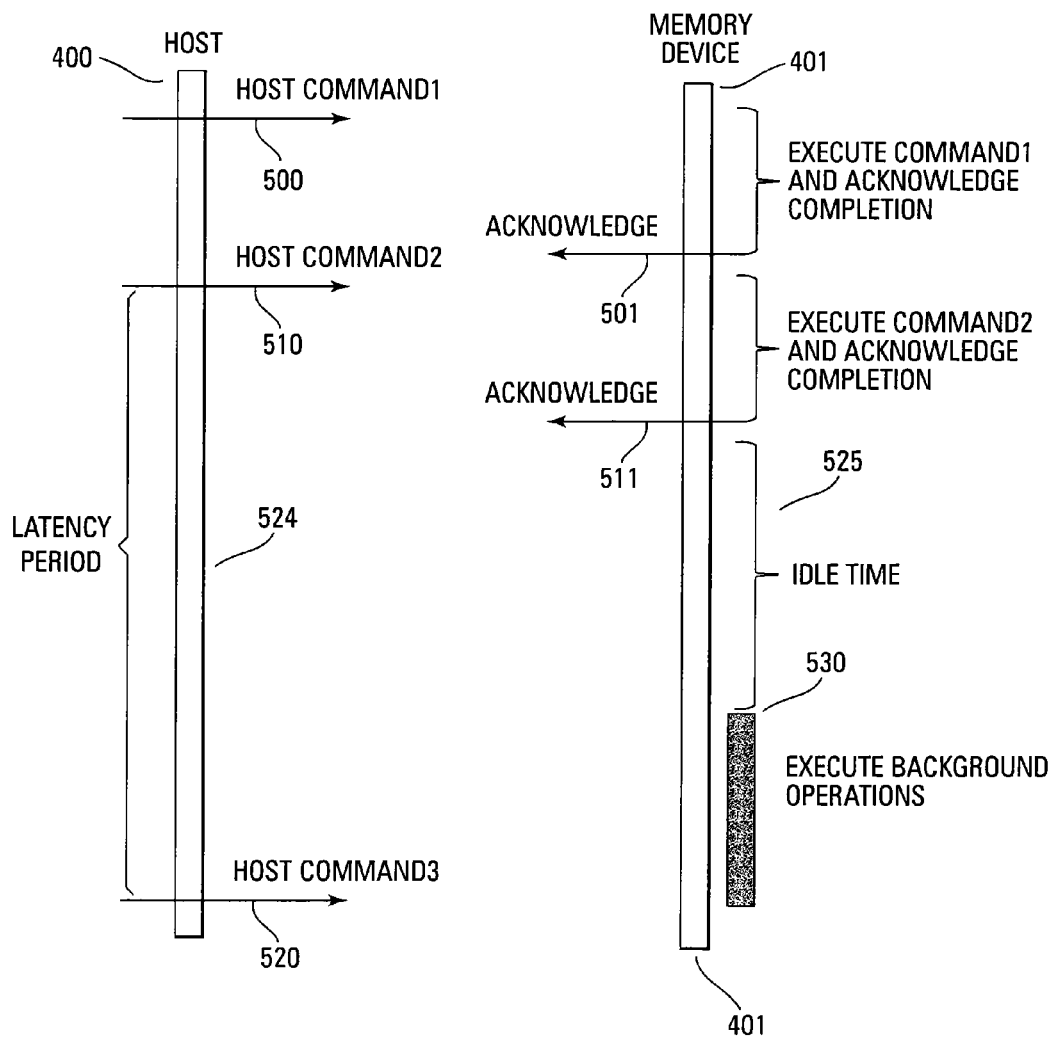
FIG. 5 shows a diagram of an execution phase of the method for host controlled enablement of automatic background operations.

FIGS. 4 and 5 illustrate examples of operation of the interaction between the host 400 and the memory device 401 as part of the method for host enablement of automatic background operations in the memory device. These diagrams are for purposes of illustration only as the interaction between the host and the memory device can occur differently.

FIG. 4 illustrates a check and configuration phase of operation between the host 400 and the memory device 401. The host 400 reads the status register 410 of the memory device 401 to determine if the memory device 401 supports host controlled enablement of automatic background operations. If the memory device 401 supports this feature, the memory device responds 411 with the register data indicating that this feature is supported.

If the feature is supported, the host 400 can then write control data to the enablement register 420 to configure this feature. The memory device 401 can then acknowledge 421 that the feature has been activated.

Once the automatic background operations have been enabled, the host 400 can transmit a time period value 430 to the memory device 401 to be stored in the time register. As previously discussed, this can be the minimum time period that the memory device 401 should wait prior to automatically performing the background operations. The memory device can then acknowledge receipt and setting of this time period with an acknowledgement message 431.

FIG. 5 illustrates an execution phase of operation between the host 400 and the memory device 401 as a result of the memory device 401 supporting the host controlled enablement of automatic background operations. This phase of operation assumes that the host 400 has determined that the memory device 401 supports the host controlled enablement of automatic background operations and that the memory device has been configured to enable this feature. For example, the method of FIG. 4 might already have occurred.

The host 400 can transmit COMMAND1 (e.g., read or write command) 500 to the memory device 401. The memory device 401 executes the received COMMAND1 and transmits an acknowledgement 501 to the host 400 upon completion. For example, the memory device 401 can transmit a completion message to the host 400 when the commanded operation has been completed.

The host 400 might transmit another command, COMMAND2 (e.g., read or write) 510 to the memory device 401. The memory device 401 executes the received COMMAND2 and transmits an acknowledgement 511 to the host 400 upon completion. For example, the memory device 401 can transmit a completion message to the host 400 when the commanded operation has been completed.

There can then be a latency period 524 in the host 400 where the host 400 is not transmitting commands to the memory device 401. Since the memory device 401 has already been instructed to not automatically perform background operations for a particular time period (e.g., time period value), the memory device 401 is in an idle state 525 for this time period. After the time period has expired, the memory device can automatically perform 530 the background operations (e.g., housekeeping operations). The automatic background operations are performed until they have been completed, the memory device loses power, or until another command is received from the host that interrupts the background operations. For example, the host 400 might transmit another command COMMAND3 520 to the memory device 401. Such a command would cause the memory device 401 to halt performance of the background operations in order to service the interrupt.

In an alternate embodiment where a time register is not used, the host 400 could transmit a start command to the memory device 401. The memory device 401 would remain in the idle state until receiving the start command. Upon receipt of the start command, the memory device 401 would start background operations.

CONCLUSION

In summary, one or more embodiments of the method for host controlled enablement of automatic background operations in a memory device can provide more reliable execution of the background operations since the host is now aware of when the memory device is performing housekeeping tasks. Since the host enables the feature and informs the memory device when it can automatically perform background operations, the host can know the best time to interrupt the memory device with a command. Additionally, the host will know when not to shut off power for the memory device while the background operations are being performed.

Although specific embodiments have been illustrated and described herein, it will be appreciated by those of ordinary skill in the art that any arrangement that is calculated to achieve the same purpose may be substituted for the specific embodiments shown. Many adaptations of the invention will be apparent to those of ordinary skill in the art. Accordingly, this application is intended to cover any adaptations or variations of the invention.

What is claimed is:

1. A method for host controlled enablement of an automatic background operation in a memory device, the method comprising:
   determining at the host whether the memory device indicates that the memory device supports host controlled enablement of the automatic background operation; and
   using the host to configure the memory device to perform the automatic background operation in the memory device in response, at least in part, to determining at the host that the memory device indicates that the memory device supports the host controlled enablement of the automatic background operation.

2. The method of claim 1 and further comprising writing a time period value to a register of the memory device.

3. The method of claim 2 wherein the time period is a time that the memory device should wait before automatically performing the background operation.

4. The method of claim 2 wherein the time period is a time that the memory device should wait before enabling the automatic background operation.

5. The method of claim 1 and further comprising transmitting a start command to the memory device configured to indicate to the memory device to start the automatic background operation.

6. The method of claim 1 wherein determining at the host whether the memory device supports host controlled enablement of the automatic background operation comprises the host reading a register of the memory device.

7. The method of claim 1 wherein using the host to configure the memory device to perform the automatic background operation comprises the host transmitting control data to the memory device.

8. The method of claim 1 wherein using the host to configure the memory device to perform the automatic background operation comprises the host writing control data to a register of the memory device.

9. A method for host controlled enablement of an automatic background operation in a memory device, the method comprising:
   determining if the memory device supports host controlled enablement of the automatic background operation;
   enabling the automatic background operation in the memory device based, at least in part, on determining that the memory device supports host controlled enablement of the automatic background operation;
   the host writing a time period value to a first register of the memory device; and
   the host writing a unit of measure value for the time period value to a second register of the memory device.

10. The method of claim 9 wherein the host writing comprises the host directly writing to the first register without intervention of a controller of the memory device.

11. The method of claim 9 wherein the host writing comprises the host writing to the first register with intervention of a controller of the memory device.

12. A method for host controlled enablement of an automatic background operation in a memory device, the method comprising:
   determining if the memory device supports host controlled enablement of the automatic background operation;
   enabling the automatic background operation in the memory device based, at least in part, on determining that the memory device supports host controlled enablement of the automatic background operation;
   wherein determining if the memory device supports host controlled enablement of the automatic background operation comprises the host reading a register of the memory device; and
   wherein the host reading a first state from the register indicates that the memory device supports host controlled enablement of the automatic background operation and the host reading a second state from the register indicates that the memory device does not support host controlled enablement of the automatic background operation.

13. A system comprising:
   a host; and
   a memory device coupled to the host;
   wherein the host is configured to determine whether the memory device indicates that the memory device supports host controlled enablement of an automatic background operation; and
   wherein the host is configured to configure the memory device to perform the automatic background operation in the memory device in response, at least in part, to the host determining that the memory device indicates that the memory device supports the host controlled enablement of the automatic background operation.

14. The system of claim 13 wherein the memory device further comprises a plurality of registers comprising a status register, an enablement register, and a time register.

15. The system of claim 14 wherein the plurality of registers further comprises a unit of measure register associated with the time register.

16. The system of claim 14 wherein the status register is a read only register and the enablement register and time register are write/read registers.

17. The system of claim 14 wherein the status register is not programmable by the host.

18. The system of claim 14 wherein the host is configured to write control data to the enablement register wherein the control data is configured to enable or disable automatic performance of the automatic background operation by the memory device.

19. The system of claim 14 wherein the host is configured to write a time period value to the time register wherein the time period value is indicative of when the memory device can automatically perform the automatic background operation.

20. The system of claim 14 wherein the host is configured to write a time period value to the time register wherein the time period value is indicative of a time when the memory device is enabled for the automatic background operation.

21. The system of claim 13 and further comprising a register having different register bits configured to selectively enable different automatic background operations.

\* \* \* \* \*